Jan. 29, 1929.

A. J. BASTIAN 1,700,605

MOLDED GEAR

Filed Sept. 2, 1926

WITNESSES:
C. J. Weller.
M. B. Jaspert

INVENTOR
Arthur J. Bastian.
BY
Wesley G. Carr
ATTORNEY

Patented Jan. 29, 1929.

1,700,605

UNITED STATES PATENT OFFICE.

ARTHUR J. BASTIAN, OF WILKINSBURG, PENNSYLVANIA, ASSIGNOR TO WESTINGHOUSE ELECTRIC & MANUFACTURING COMPANY, A CORPORATION OF PENNSYLVANIA.

MOLDED GEAR.

Application filed September 2, 1926. Serial No. 133,285.

My invention relates to composite articles, more particularly to composite gear-wheels comprising fibrous material compounded with well-known phenolic condensation products.

It is among the objects of my invention to provide a composite article of fibrous material and a hardened binder, which shall have a relatively dense and hard working body portion and a relatively flexible and yielding supporting structure formed integrally therewith.

Another object of my invention is to provide a composite article of the above-designated character which shall be formed of layers of fibrous sheet material, some of which are treated with a binder and assembled with the remaining layers in such manner that the final product, after a molding operation is performed, will constitute an integral body structure.

Another object of my invention is to provide a composite article of the above-designated character which may be compounded with structural forms to produce gear-wheels, pulleys, disc wheels, or the like, in which the working body portion is preferably constructed of a non-metallic substance.

Various composite articles having non-metallic working portions have been heretofore constructed for different purposes and uses, and these vary in form and design in accordance with the purpose of their application, and the service conditions to which they are subjected.

It is the purpose of my present invention to provide a composite wheel structure in which the working body portion is formed integrally with its central supporting structure by the utilization of a relatively simple and inexpensive process.

In the accompanying drawing, constituting a part hereof and in which like reference characters designate like parts, Fig. 1 is a view in side elevation of a composite article embodying the principles of my invention;

Figure 1:
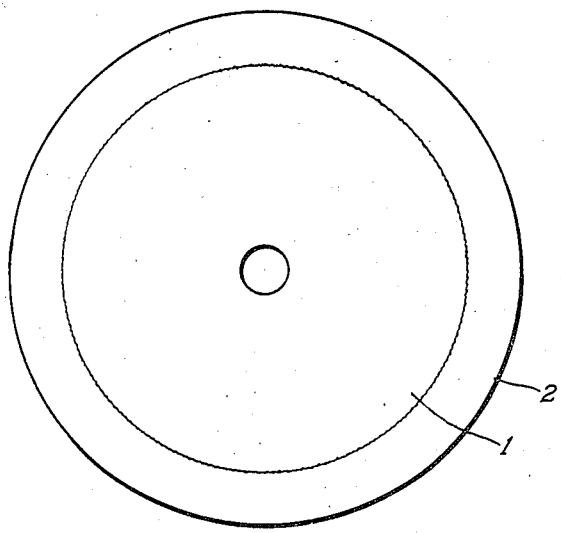
Figure 2:
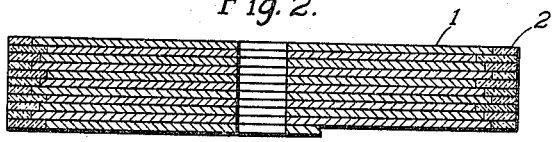
Fig. 2 is a cross-sectional view of a plurality of layers of fibrous sheet material that are assembled to form the article shown in Fig. 1, prior to being subjected to a molding operation.

Referring to Figs. 1 and 2 of the drawing, I assemble a plurality of layers of fibrous sheet material 1 comprising discs of different diameters, together with a plurality of rings 2, also of different internal diameters, the rings being complementary in size with respect to the corresponding discs, in the manner shown. The rings 2 may be of the same or different material, as regards the discs 1, and they are subjected to treatment with a binder, such as a phenolic condensation product, in a well-known manner, as by impregnation, coating or otherwise, and this may be done while the material is in sheet form, to facilitate the treating operation.

Sheets of material so treated are subsequently dried to drive off the solvent and they are then worked into ring shape by a punching operation. The rings and discs, arranged in the manner shown in Fig. 2, to overlap each other, are joined or consolidated by a molding operation by placing the assembled layers in a suitable mold (not shown) and subjecting the ring portions thereof to heat and pressure, which causes the phenolic condensation product to fuse and flow into the untreated discs 1. By a prolongation of the process the binder is solidified, thus rendering the outer peripheral portion of the molded article a solid integral mass, for a depth slightly beyond the inner peripheries of the ring members.

Figure 3:
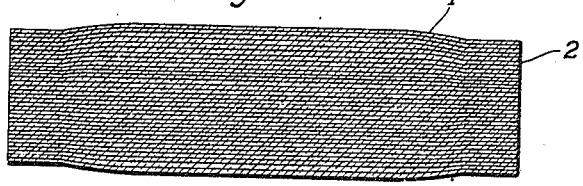
Fig. 3 is a cross-sectional view of a completed article having its outer periphery molded in accordance with my invention.
Figure 4:
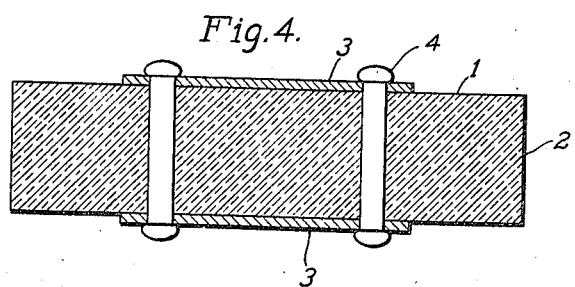
Fig. 4 is a sectional view of the structure shown in Fig. 3, after being assembled between a pair of side plates to constitute a disc wheel or gear blank.

The resultant article is of a shape substantially as illustrated in Fig. 3, which shows the end portions to be consolidated and the laminations or sheets of the center body portion somewhat separated, as results when the pressure is released therefrom upon removal from the mold. The body portion that is shown in Fig. 3 may be subsequently compressed by the utilization of a pair of end plates 3, which are secured thereto by rivets or bolts 4 in any suitable manner. The plates may be applied under pressure to make the center body portion equal in thickness to the molded part.

The structure so formed may be utilized as a gear blank, since the material is susceptible to machining operations and may readily be turned and cut to form gear teeth in the outer peripheries thereof. The blank may also be utilized as a friction roller pulley or wheel, if desired.

It is evident from the foregoing description of my invention that a composite article made in accordance therewith provides a durable, flexible and relatively inexpensive gear-wheel structure, in which the working body portion is of great density and hardness and the central body support is soft and yielding, but of sufficient rigidity and mechanical strength to properly function in the transmission of torque from its hub or seat portion to the tooth members.

Although I have described a specific embodiment of my invention it will be obvious to those skilled in the art that various changes may be made in the details of construction within the scope of the invention; as, for instance, the shape of the material or article to be manufactured may be altered to rectangular forms and irregular contours without departing from the principles herein set forth.

I claim as my invention:

1. A composite article comprising a plurality of superposed layers of untreated fibrous sheet material and a plurality of heated endless strips disposed therearound, said strips being joined to said layers by a heat-hardened binder.

2. A composite article comprising a plurality of superposed discs of untreated fibrous sheet material and a plurality of superposed rings disposed therearound, said rings being compounded with a heat-hardened binder to constitute a solid mass integrally attached to said discs.

3. A composite article comprising a plurality of superposed discs of fibrous sheet material and a plurality of superposed rings disposed therearound, said discs and rings being of varying diameters and said rings being consolidated and joined to said discs by a heat-hardened binder.

4. A composite article comprising a plurality of superposed discs of fibrous sheet material of different diameters and a plurality of rings of similar material having inner diameters respectively corresponding to the different diameters of said discs and being consolidated with a heat-hardened binder.

5. A composite article comprising a plurality of superposed discs of fibrous sheet material having alternate discs of different diameters and superposed rings of similar material of different diameters disposed around said discs in engagement therewith, said rings being consolidated with a hardened binder and integrally joined with the engaging portions of said discs.

6. A composite article comprising a plurality of superposed discs of fibrous sheet material, alternate discs having different diameters, and superposed rings of similar material of different diameters disposed around said disc in engagement therewith, said rings being consolidated with a phenolic condensation product and joined integrally with the engaging portions of said discs.

7. A composite article comprising a plurality of superposed discs of fibrous sheet material, alternate discs having different diameters, and superimposed rings of similar material of different diameters disposed around said discs in engagement therewith, said discs and rings being arranged to stagger the joints constituted by the junctures of the discs and rings, and said rings being consolidated with a hardened binder and integrally joined with the engaging portions of said discs.

8. The method of making composite articles which comprises assembling a plurality of layers of fibrous sheet material in the form of discs and rings of varying diameters, the rings of which are treated with a binder, and subjecting said assembled layers to the influence of heat and pressure to consolidate said rings.

9. The method of making composite articles which comprises assembling a plurality of layers of fibrous sheet material in the form of discs and rings of varying diameters, the rings of which are treated with a binder, and subjecting said assembled layers to the influence of heat and pressure to consolidate said rings and join them with said discs.

10. The method of making composite articles which comprises assembling a plurality of layers of fibrous sheet material in the form of discs and rings of varying diameters, alternate layers comprising relatively small diameter discs and corresponding rings, and relatively large diameter discs and corresponding rings, and and joining the rings with said discs.

In testimony whereof, I have hereunto subscribed my name this 30th day or August, 1926.

ARTHUR J. BASTIAN.